United States Patent
Kuhlmann et al.

(10) Patent No.: US 11,869,259 B2
(45) Date of Patent: *Jan. 9, 2024

(54) TEXT LINE IMAGE SPLITTING WITH DIFFERENT FONT SIZES

(71) Applicant: LEVERTON HOLDING LLC, Solon, OH (US)

(72) Inventors: Florian Kuhlmann, Berlin (DE); Michael Kieweg, Berlin (DE)

(73) Assignee: LEVERTON HOLDING LLC, Solon, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 17/503,906

(22) Filed: Oct. 18, 2021

(65) Prior Publication Data

US 2022/0108555 A1 Apr. 7, 2022

Related U.S. Application Data

(63) Continuation of application No. 16/546,982, filed on Aug. 21, 2019, now Pat. No. 11,151,371.

(Continued)

(51) Int. Cl.
*G06V 30/144* (2022.01)
*G06V 30/148* (2022.01)
(Continued)

(52) U.S. Cl.
CPC .......... *G06V 30/158* (2022.01); *G06F 40/284* (2020.01); *G06V 30/153* (2022.01); *G06V 30/414* (2022.01); *G06V 30/10* (2022.01)

(58) Field of Classification Search
CPC ... G06K 9/00463; G06K 9/344; G06F 40/284
See application file for complete search history.

(56) References Cited

U.S. PATENT DOCUMENTS 5,278,918 A 1/1994 Bernzott et al.
11,151,371 B2 * 10/2021 Kuhlmann ........... G06V 30/414
(Continued)

FOREIGN PATENT DOCUMENTS

CA 2963808 10/2017

OTHER PUBLICATIONS

International Search Report and Written Opinion dated Nov. 26, 2019 issued for International PCT Application No. PCT/US19/47473 filed Aug. 21, 2019.

*Primary Examiner* — David F Dunphy
(74) *Attorney, Agent, or Firm* — K&L Gates LLP

(57) ABSTRACT

A method for splitting text line images includes receiving a text line image and identifying that the text line image comprises a plurality of zones, wherein each zone includes text whose font differs from the text of adjacent zones. The method further includes selecting a splitting position between multiple zones and splitting the text line image at the splitting position into a plurality of image segments, wherein each image segment contains at least one zone of the text line image and performing optical character recognition on each image segment to recognize a text segment of the image segment. In certain implementations, the method further includes generating one or more confidence measurements and selecting a splitting position that corresponds to a large gradient in the confidence measurement.

20 Claims, 8 Drawing Sheets

Related U.S. Application Data

(60) Provisional application No. 62/721,185, filed on Aug. 22, 2018.

(51) Int. Cl.
 *G06F 40/284* (2020.01)
 *G06V 30/414* (2022.01)
 *G06V 30/10* (2022.01)

(56) References Cited

U.S. PATENT DOCUMENTS

| | | |
|---|---|---|
| 2004/0013302 A1 | 1/2004 | Ma et al. |
| 2004/0146199 A1 | 7/2004 | Berkner |
| 2011/0243444 A1 | 10/2011 | Mitic |
| 2013/0136359 A1 | 5/2013 | Mitic |
| 2014/0067631 A1 | 3/2014 | Dhuse et al. |
| 2014/0219561 A1 | 8/2014 | Nakamura |
| 2015/0302598 A1 | 10/2015 | Collet et al. |

\* cited by examiner

| Text Line Image | OCR Output (No Splitting) | OCR Output (With Splitting) |
|---|---|---|
| Font with larger size Font with smaller size — 102 | Font with larger size sant win smanar szs — 114 | Font with larger size — 126  Font with smaller size |
| Font with larger size Font with smaller size — 104 | Font with larger size sane wren manes airs — 116 | Font with larger size — 128  Font with smaller size |
| Font with larger size Font with smaller size — 106 | Font with larger size sant win smaller sis — 118 | Font with larger size — 130  Font with smaller size |
| Font with larger size Font with smaller size — 108 | Font with larger size rent wim smatter size — 120 | Font with larger size — 132  Font with smaller size |
| Font with larger size Font with smaller size — 110 | Font with larger size sawn smalarszs — 122 | Font with larger size — 134  Font win smaller size |
| Font with larger size Font with smaller size — 112 | Font with larger size rent wren manter size — 124 | Font with larger size — 136  Font with smaller size |

FIG. 1

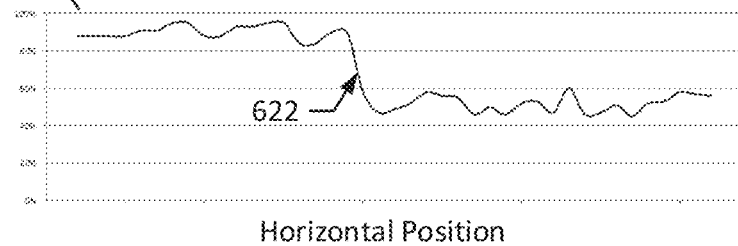
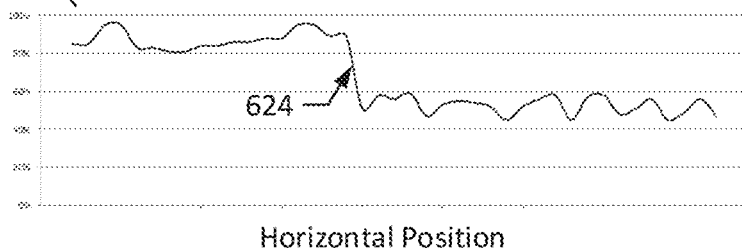
Fig. 6B 600
630
) agrees to be bound by
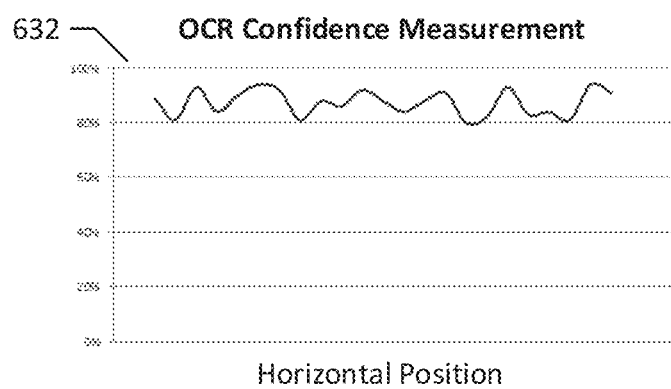
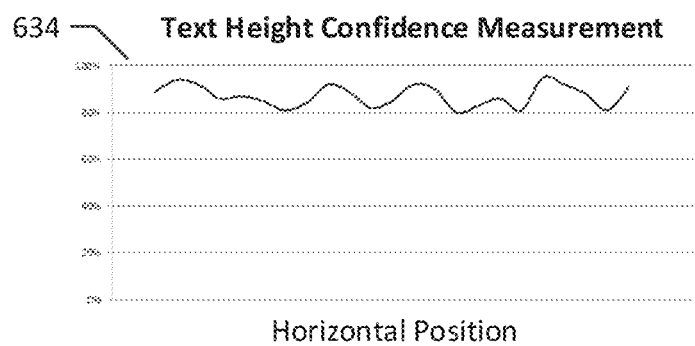
Fig. 6C

TEXT LINE IMAGE SPLITTING WITH DIFFERENT FONT SIZES

CROSS-REFERENCE TO RELATED APPLICATIONS

The present application is a continuation application of U.S. patent application Ser. No. 16/546,982 filed on Aug. 21, 2019 which claims priority to U.S. Provisional Patent Application No. 62/721,185 filed on Aug. 22, 2018. The entire disclosures of said applications are incorporated herein by reference for all purposes in their entireties.

BACKGROUND

Documents may be scanned into document images for processing and review by an automated document processing system. Before the document images can be processed, it may be necessary to recognize the text contained in the document images, which is commonly done with an optical character recognition (OCR) system. Such OCR systems often require that the size and position of the text in a document image be normalized.

SUMMARY

The present disclosure presents new and innovative systems and methods for recognizing the text contained within text line images. In one example, a computer-implemented method is provided comprising (a) receiving a text line image associated with a line of text contained within a document image, (b) identifying that the text line image comprises a plurality of zones, wherein each zone contains text whose font differs from the text of each adjacent zone, and (c) selecting at least one splitting position between multiple zones of the text line image. The method may further comprise (d) splitting the text line image at the splitting position into a plurality of image segments, wherein each image segment contains at least one zone of the text line image, and (e) performing optical character recognition (OCR) on each image segment to recognize a corresponding text segment of each image segment.

In another example according to the first example, the method may further comprise combining the text segments to create a text of the text line image. In a further example according to any one of the previous examples, steps (b) and (c) of the method may further comprise performing OCR on the text line image, generating an OCR confidence measurement comprising a predicted OCR accuracy of the text line image for a plurality of positions of the text line image, and selecting a splitting position within the text line image based on the OCR confidence measurement. In a still further example according to any one of the previous examples, the splitting position may be selected based on a large gradient of the OCR confidence measurement.

In another example according to any one of the previous examples, the plurality of positions of the text line image include positions corresponding to one or more words contained in the text line image. In a further example according to any one of the previous examples, steps (b) and (c) may further comprise estimating a text height of the text line image, generating a text height confidence measurement comprising a predicted accuracy of the estimated text height for a plurality of positions of the text line image, and selecting a splitting position within the text line image based on the text height confidence measurement. In a still further example according to any one of the previous examples, the splitting position may be selected based on a large gradient of the text height confidence measurement.

In another example according to any one of the previous examples, the plurality of positions of the text line image may include positions corresponding to one or more words contained in the text line image. In a further example according to any one of the previous examples, steps (b) to (d) may be repeated on at least one of the image segments to select additional splitting positions of the text line image and to split the text line image into additional image segments. In a still further example according to any one of the previous examples, the text whose font differs may differ from the text of each adjacent zone with a difference from the group consisting of a different size, a different typeface, and/or a different vertical position within the text line image. In another example according to any one of the previous examples, the method may further comprise repeating steps (a) to (e) on a plurality of text line images associated with the document image.

In another example, a system may be provided comprising a processor and a memory. The memory may store instructions which, when executed by the processor, cause the processor to (a) receive a text line image associated with a line of text contained within a document image, the text line image comprising a plurality of zones, wherein each zone contains text whose font differs from the text of each adjacent zone, (b) identify that the text line image comprises a plurality of zones, wherein each zone contains text whose font differs from the text of each adjacent zone, and (c) select a splitting position between multiple zones of the text line image. The memory may store further instructions which, when executed by the processor, cause the processor to (d) split the text line image at the splitting position into a plurality of image segments, wherein each image segment contains at least one zone of the text line image, and (e) perform optical character recognition (OCR) on each image segment to recognize a corresponding text segment of each image segment.

In another example according to the previous example, the memory stores further instructions which, when executed by the processor, cause the processor to combine the text segments to create a text of the text line image. In a further example according to any of the previous examples, the memory stores further instructions which, when executed by the processor at steps (b) and (c), cause the processor to perform OCR on the text line image, generate an OCR confidence measurement comprising a predicted OCR accuracy of the text line image for a plurality of positions of the text line image, and select a splitting position within the text line image based on the OCR confidence measurement. In a still further example according to any of the previous examples, the memory stores further instructions which, when executed by the processor at step (c), cause the processor to select the splitting position based on a large gradient of the OCR confidence measurement.

In another example according to any of the previous examples, the memory stores further instructions which, when executed by the processor at steps (b) and (c), cause the processor to estimate a text height of the text line image, receive a text height confidence measurement comprising a predicted accuracy of the text height for a plurality of positions of the text line image, and select a splitting position within the text line image based on the text height confidence measurement. In a still further example according to any of the previous examples, the memory stores further instructions which, when executed by the processor at step (c), cause the processor to select the splitting position based on a large gradient of the text height confidence measurement.

In another example according to any of the previous examples, the memory stores further instructions which, when executed by the processor, cause the processor to repeat steps (b) to (d) on at least one of the image segments to select additional splitting positions of the text line image and to split the text line image into additional image segments. In a further example according to any of the previous examples, the text whose font differs may differ from the text of each adjacent zone with a difference from the group consisting of a different size, a different typeface, and/or a different vertical position within the text line image. In a still further example according to any of the previous examples, the memory stores further instructions which, when executed by the processor, cause the processor to repeat steps (a) to (e) on a plurality of text line images associated with the document image.

In a further example, a computer-readable medium may be provided containing instructions which, when executed by one or more processors, cause the one or more processors to (a) receive a text line image associated with a line of text contained within a document image, the text line image comprising a plurality of zones, wherein each zone contains text whose font differs from the text of each adjacent zone, (b) identify that the text line image comprises a plurality of zones, wherein each zone contains text whose font differs from the text of each adjacent zone, (c) select at least one splitting position between multiple zones of the text line image, (d) split the text line image at the splitting position into a plurality of image segments, wherein each image segment contains at least one zone of the text line image, and (e) perform optical character recognition (OCR) on each image segment to recognize a corresponding text segment of each image segment.

In another example according the previous examples, the computer-readable medium may contain further instructions which, when executed by one or more processors, cause the one or more processors to combine the text segments to create a text of the text line image. In a further example according to any of the previous examples, the computer-readable medium may contain further instructions which, when executed by one or more processors at steps (b) and (c), cause the one or more processors to perform OCR on the text line image, generate an OCR confidence measurement comprising a predicted OCR accuracy of the text line image for a plurality of positions of the text line image, and select a splitting position within the text line image based on the OCR confidence measurement. In a still further example according to any of the previous examples, the computer-readable medium may contain further instructions which, when executed by one or more processors at step (c), cause the one or more processors to select the splitting position based on a large gradient of the OCR confidence measurement.

In another example according to any of the previous examples, the computer-readable medium may contain further instructions which, when executed by one or more processors at steps (b) and (c), cause the one or more processors to estimate a text height of the text line image, receive a text height confidence measurement comprising a predicted accuracy of the text height for a plurality of positions of the text line image, and select a splitting position within the text line image that corresponds the text height confidence measurement. In a further example according to any of the previous examples, the computer-readable medium may contain further instructions which, when executed by one or more processors at step (c), cause the one or more processors to select the splitting position based on a large gradient of the text height confidence measurement. In a still further example according to any of the previous examples, the computer-readable medium may contain further instructions which, when executed by one or more processors, cause the one or more processors to repeat steps (b) and (c) on at least one of the image segments to select additional splitting positions of the text line image and to split the text line image into additional image segments.

In another example according to any of the previous examples, the text whose font differs may differ from the text of each adjacent zone with a difference from the group consisting of a different size, a different typeface, and/or a different vertical position within the text line image. In a further example according to any of the previous examples, the computer-readable medium may contain further instructions which, when executed by one or more processors, cause the one or more processors to repeat steps (a) to (d) on a plurality of text line images associated with the document image.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE FIGURES

FIG. 1 illustrates multiple text line images and OCR outputs, according to example embodiments of the prior art and the present disclosure.

FIGS. 6A-6C illustrate an example line splitting operation according to an example embodiment of the present disclosure.

DETAILED DESCRIPTION OF EXAMPLE EMBODIMENTS

Figure 2:
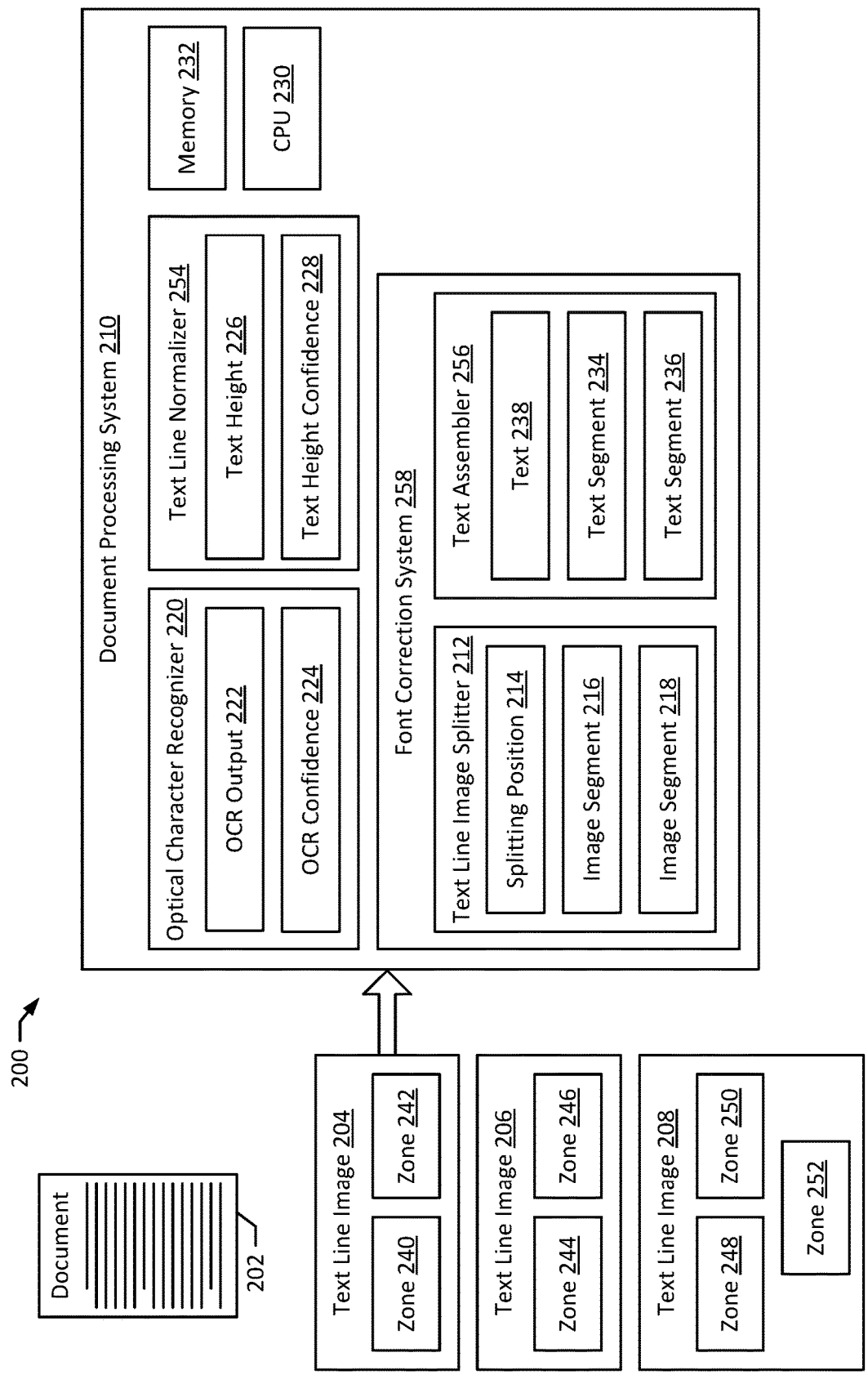
FIG. 2 illustrates a system, according to an example embodiment of the present disclosure.

One growing area of application of automated document processing is the automated analysis of legal documents. For example, automated tools, such as those from Leverton GmbH, can be used to automate the process of reviewing large numbers of contracts, leases, title deeds, and other legal or financial documents during a due diligence process. Certain documents are obtained by these tools as document images, e.g., scanned document images or other documents without text information. To automate the analysis of these document images, optical character recognition may need to be performed on the text of the document image to facilitate automatic review of the contents of the text. Automatic review may include determining document type, named entity identification, and agreement term analysis. Before recognizing the text contained within a document image, the document image is typically divided into a plurality of text line images, each containing a line of text from the document image (e.g., text lines 102, 104, 106, 108, 110, 112 of FIG. 1). However, the size of these text line images often varies within the same document because the size of text in the document itself varies. Additionally, neither the height of the text nor the position of the text in each text line image is typically known. For example, a text line image containing large text will be vertically taller than a text line image containing smaller text. Similarly, depending on the text line image separation, the text may be in different positions within each text line image. To properly recognize the text contained in the text line images, optical character recognition (OCR) systems generally require the text line images to be of a fixed size (e.g., the same height) and the position of the text in the text line image to be consistent (e.g., located in a certain position or range of positions). To normalize the text line images to meet these requirements, additional information is needed related to the text height, e.g., an upper and lower bound of a portion of the text within the image.

Typical text line normalization systems estimate a single text height for each text line image. As most lines of text contain text of the same size, the single estimated text height is generally sufficient to properly normalize a text line image. However, in certain cases, text line images may contain text with differing fonts. For example, some of the text may be in a smaller font size and some of the text may be in a larger font size, as shown in text line images 102, 104, 106, 108, 110, 112. Additionally, in certain cases the font or typeface itself may change within the same text line image. Further, even where text is in the same size and typeface, the vertical positioning of the text within the text line image may change within the text line image. Text lines with differing fonts may arise, for example, with documents stored in portable document format (PDF) that are filled out using PDF viewing and editing software. Additionally, these in-line font differences may be common in certain business or legal contexts, where documents are automatically generated from templates.

In either case, text line images containing text of differing fonts or sizes may be processed incorrectly by conventional text line normalization and OCR systems. For example, because conventional systems use a single estimated text height for the entire text line image, the estimated text height may be inaccurate for one or more zones of the text line image whose font size or typeface differs from the single estimated text height. Therefore, when the text line image is normalized using the estimated text height, the text whose size or typeface differs may be improperly normalized, resulting in inaccurate text recognition by the OCR system. For example, FIG. 1 depicts multiple text line images 102, 104, 106, 108, 110, 112 containing text with different font typefaces and/or sizes, along with corresponding OCR outputs 114, 116, 118, 120, 122, 124. In each of the examples, the text line images 102, 104, 106, 108, 110, 112 were normalized according to the text height of the text with a larger font. Accordingly, the text with a larger font was accurately normalized and thus accurately recognized by the OCR system, but the text with the smaller size in the same line was not properly normalized and thus not accurately recognized by the OCR system. Accordingly, to more accurately recognize the text contained within such text line images, it may be helpful to both identify the zones of the text line images that contain text whose fonts differ from adjacent zones and to estimate a separate corresponding text height for those zones.

One innovative procedure, described in the present disclosure, to both identify the zones and estimate the separate corresponding text heights is to select a splitting position between the zones of a text line image and split the text image at the splitting position. For example, if there are two zones in a text line image, each containing text with a different font, splitting the image at a splitting position between the zones will provide two image segments, each containing a single zone and thus text with the same font typeface and size. Accordingly, a single text height can then be estimated for each image segment, and the estimated text height can then be used to normalize the image segment for OCR processing. In some cases, the text line image may contain more than two zones with differing fonts. In such cases, it may be helpful to select multiple splitting positions, e.g., by finding another splitting position within one of the image segments and splitting this image segment into two further image segments. Accordingly, this procedure may be repeated recursively until all of the splitting positions are identified and each image segment contains a single zone contains text of the same font. For example, such a procedure was performed on the text line images 102, 104, 106, 108, 110, 112 to generate the OCR outputs 126, 128, 130, 132, 134, 136, which resulted in accurately recognized text for both font sizes in all but one case.

One approach to selecting the splitting positions is to perform optical character recognition on the text line image and then use an OCR confidence measurement that indicates a predicted accuracy of the OCR procedure to locate the splitting positions. As an estimation of the accuracy or confidence of the OCR operation, an OCR confidence measurement is likely to be high for portions of a text line image that are accurately predicted (e.g., that have the same text height as the estimated text height for the text line image) and is likely to be low for portions of the text line image that are inaccurately predicted (e.g., that have a different text height than the estimated text height for the text line image). Accordingly, positions where the OCR confidence measurement changes quickly (e.g., large gradients from low confidence to high confidence, or vice-versa) are likely to indicate transitions between zones with differing fonts. Splitting positions can be selected for splitting the image segments near these large gradients. In certain instances, a text height confidence measurement representing the confidence of the text line height estimation may be used instead of or in addition to the OCR confidence measurement. In further embodiments, more than one splitting position in a line may be selected by identifying more than one large gradient in the OCR confidence measurement and/or text height confidence measurement.

FIG. 2 depicts a system 200, according to an example embodiment of the present disclosure. The system 200 includes a document processing system 210, a document 202, and text line images 204, 206, 208. The text line images contain zones 240, 242, 244, 246, 248, 250, 252. The document processing system 210 includes an optical character recognizer 220, a text line normalizer 254, a font correction system 258, a memory 232, a CPU 230 and a GPU 260. The optical character recognizer 220 further stores an OCR output 222 and an OCR confidence measurement 224. The text line normalizer 254 further stores a text height 226 and a text height confidence measurement 228. The font correction system 258 further includes a text line image splitter 212 and a text assembler 256. The text line image splitter 212 stores a splitting position 214 and image segments 216, 218. The text assembler 256 stores a text 238 and text segments 234, 236.

The document processing system 210 may be configured to receive text line images 204, 206, 208, which may be associated with a document 202. For example, text line images 204, 206, 208 may come from the same page of the document 202 and, in certain examples, may be adjacent to one another within the document. In some embodiments, the document 202 and/or the text line images 204, 206, 208 may be stored in the memory 240 after being received by the document processing system 210. The document 202 may be received from a document server configured to store multiple documents. The document 202 may be a document image, such as a scanned image of a paper document, or may include another document file lacking text information. In certain implementations, rather than receiving separate text line images that came from the document 202, the document processing system 210 may receive a document image 202, along with indications of the locations of the lines on the page. In such implementations, the document processing system 210 may separately convert the document image 202 into text line images 204, 206, 208 to continue processing.

The document 202 may be intended for automated analysis, as described above. For example, the document 202 may be one or more of a lease agreement, a purchase sale agreement, a title insurance document, a certificate of insurance, a mortgage agreement, a loan agreement, a credit agreement, an employment contract, an invoice, a financial document, and an article. The document 202 may be analyzed to assess one or more legal or business risks, such as contract exposure, or to perform due diligence on a real estate portfolio. Although depicted in the singular, in some embodiments the document processing system 210 may be configured to receive and process text line images 204, 206, 208 associated with more than one document 102 at a time. For example, the document processing system 210 may be configured to receive text line images 204, 206, 208 from multiple documents 202 of the same type (e.g., residential leases) or may be configured to receive text line images 204, 206, 208 from multiple documents 202 of multiple types (e.g., residential leases and commercial leases).

The text line images 204, 206, 208 may contain a single line of text extracted from a document 202. In certain embodiments, the text line images 204, 206, 208 may be extracted from the same document 202, or may be extracted from multiple documents 202 (e.g., documents of the same document type). The text line images 204, 206, 208 may be extracted before being received by the document processing system 210. In other embodiments, the document processing system 210 may be configured to receive the document 202 and to further extract the text line images 204, 206, 208.

The document processing system 210 may be configured to receive text line images 204, 206, 208 and/or documents 202 for further processing to normalize the text lines contained with the text line images 204, 206, 208 corresponding to the documents 202. For example, the document processing system 210 may receive text line images 204, 206, 208, normalize the text line images 204, 206, 208 with the text line normalizer 254, and recognize text contained within the text line images 204, 206, 208 with the optical character recognizer 220. The text line normalizer 254 may be configured to estimate a text height 226 of the text line images 204, 206, 208 and to normalize the text line images 204, 206, 208 for processing by the optical character recognizer 220, as described above. In estimating the text height 226, the text line normalizer 254 may also generate a text height confidence measurement 228, which indicates an estimated accuracy of the text height 226 estimation at a plurality of horizontal positions in the text line image 204, 206, 208. The optical character recognizer 220 may be configured to recognize the text contained within text line images 204, 206, 208, and may require that the text line images 204, 206, 208 be normalized so that the text is the same size and/or located in the same position within the normalized text line images. After recognizing the text, the optical character recognizer 220 may generate an OCR output 222 containing the text of the text line image 204, 206, 208. The optical character recognizer 220 may also generate an OCR confidence 224 that indicates a predicted accuracy of the OCR output 222 at a plurality of horizontal positions in the text line image 204, 206, 208.

The font correction system 258 may be configured to correct the processing of text line images 204, 206, 208 with multiple zones 240, 242, 244, 246, 248, 250, 252 where each zone 240, 242, 244, 246, 248, 250, 252 contains text with differing fonts (e.g., fonts with a different typeface, fonts with a different size) than the text of adjacent zones 240, 242, 244, 246, 248, 250, 252. For example, the text line image splitter 212 may be configured to select a splitting position 214 of the text line image 204, 206, 208 between two or more zones 240, 242, 244, 246, 248, 250, 252 and may split the text line image into image segments 216, 218. The image segments 216, 218 may then contain a single zone 240, 242, 244, 246, 248, 250, 252 and may then be processed correctly by the text line normalizer 254 and optical character recognizer 220 to recognize one or more text segments 234, 236 contained within the image segments 216, 218. The text assembler 256 may be configured to combine the text segments 234, 236 of the image segments 216, 218 into a single text 238 of the text line image 204, 206, 208 overall and processing may then continue with the complete text line image 204, 206, 208.

The system 200 may be implemented as one or more computer systems, which may include physical systems or virtual machines. For example, the text line normalizer 212, the optical character recognizer 234, and the font correction system 258 may be implemented by the same computer system. These computer systems may be networked, for example, by a network such as a local area network or the Internet. Alternatively, the text line normalizer 212, the optical character recognizer 234, and the font correction system 258 may be implemented as separate computer systems. In such examples, the CPU 238 may be implemented as a plurality of CPUs and the memory 240 as a plurality of memories.

Figure 3:
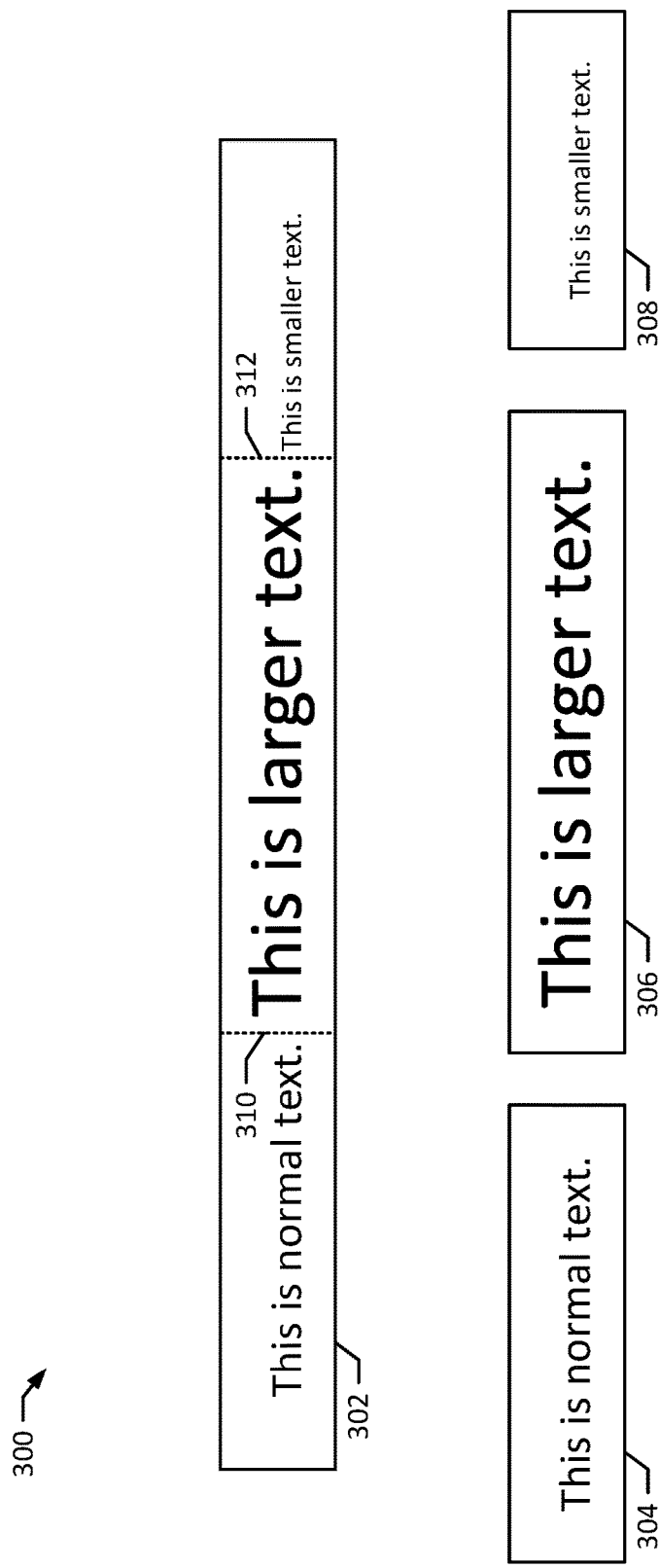
FIG. 3 illustrates a line splitting operation according to an example embodiment of the present disclosure.

FIG. 3 depicts a line splitting operation 300 according to an example embodiment of the present disclosure. The line splitting operation 300 includes a text line image 302 with three zones, each containing a different font. A first zone includes to the text "This is normal text.", a second zone includes to the text "This is larger text.", and a third zone includes to the text "This is smaller text." As can be seen in FIG. 3, the text in each of these zones is of a different size, with the text of the first zone larger than the text of the third zone, and the text of the second zone larger than the text of the first zone.

As discussed above, the text of differing fonts contained in each of the three zones may reduce OCR performance because the text of the text line image 302 cannot be properly normalized based on a single text height. In practice, a conventional text line normalizer may estimate a single text height for the entire text line image 302, despite the text line image 302 including text of three different sizes and thus 3 different text heights. In certain embodiments, the single text height may be the text height used most often in the text line image 302 (e.g., used by the most letters or used in the largest proportion of the text line image 302). Here, as the text in the second zone is the largest, it is used in the largest proportion of the text line image, and a conventional text line normalizer may normalize the text according to the text height of the larger text in the second zone. Normalizing the text line image 302 in this manner may result in proper recognition by the optical character recognizer 220 of the text in the second zone, but inaccurate recognition of the text in the other sections, similar to the errors in the OCR outputs 114, 116, 118, 120, 122, 124 of FIG. 1.

To remedy these issues, a document processing system 210 may use a font correction system 258 to select one or more splitting positions 310, 312 in the text line image 302. The splitting positions 310, 312 may separate two zones of the text line image 302. The font correction system 258 may then split the text line image 302 into image segments 304, 306, 308 so that each image segment 304, 306, 308 contains text with the same font, i.e., text from a single zone. In certain instances, the font correction system 258 may find multiple splitting positions 310, 312 in a single operation and may then split the text line image 302 into more than two image segments 304, 306, 308 in a single operation. In other implementations, the font correction system 258 may select a single splitting position 310 in the text line image 302 per operation. For example, the font correction system 258 may select the splitting position 310 and may then split the text line image 302 into the image segment 304 containing the first zone and an image segment 304 containing the second and third zones. Then, the font correction system 258 may repeat these same steps on the image segment containing the second and third zones to select the splitting position 312 and split that image segment into the further image segments 306, 308. In this way, the font correction system 258 may recursively select more than one splitting position 310, 312 in a single text line image 302. Recursive implementations such as this may be simpler to implement and develop, and may be more robust across different document types and fonts. Implementations that select more than one splitting position 310, 312 may be faster in operation, but may be less robust, e.g., limited to certain types of documents or fonts.

Once the text line image 302 is split into image segments 304, 306, 308 that each contain a single zone whose text has the same or similar font, processing may continue on each image segment individually 304, 306, 308. For example, the text line normalizer 254 may estimate a separate text height 226 for each image segment 304, 306, 308 and may use the text height 226 for each image segment 304, 306, 308 to normalize the corresponding image segment 304, 306, 308. Once normalized, the optical character recognizer 220 may then recognize the text segment 234, 236 contained within the image segments 304, 306, 308 as it would for a text line image 302 containing text of only the same height. In this way, the optical character recognizer 220 may recognize a separate text segment 234, 236 for each image segment 304, 306, 308 (e.g., separate texts segments 234, 236 containing "This is normal text.", "This is larger text.", and "This is smaller text."). In certain implementations, the image segments 304, 306, 308 may be processed together in parallel, i.e., each image segment 304, 306, 308 has its corresponding text height 226 estimated before the text segments 234, 236 of the image segments 304, 306, 308 are recognized by the optical character recognizer 220. In other implementations, the image segments 304, 306, 308, may be processed separately, i.e., each image segment 304, 306, 308 may have its text height 226 estimated, be normalized by the text line normalizer 254, and have its text segment 234, 236 recognized by the optical character recognizer before the next image segment 304, 306, 308 is processed. Additionally, in implementations where multiple splitting positions 310, 312 are identified recursively, a first image segment 304 may be processed by the text line normalizer 254 and the optical character recognizer 220 before a subsequent splitting position 310, 312 is selected.

Continued document processing activities may be configured to rely on a single text for each text line image 302. The font correction system 258 may therefore combine the text segments 234, 236 of the image segments 304, 306, 308 into a single text 238, e.g., by appending the text segments 234, 236 in the same order as the image segments 304, 306, 308 appear in the text line image 302. In certain implementations, the text assembler 256 may further combine the text 238 with the text line image 302, e.g., by positioning the text 238 so that the words contained within the text 238 overlap with their corresponding location in the text line image 302. In this way, the font correction system 258 may prepare the text line image 302 for subsequent processing, despite the text segments 234, 236 being recognized separately by the optical character recognizer 220.

Although the text line image 302 is depicted as having three zones, similar techniques may be used with text line images 204, 206, 208 containing more or fewer zones. For example, similar techniques could be used to process text line images with two zones (e.g., text line images 204, 206), or text line images with four or more zones, where each zone has text whose font differs from the text of each adjacent zone.

Figure 4:
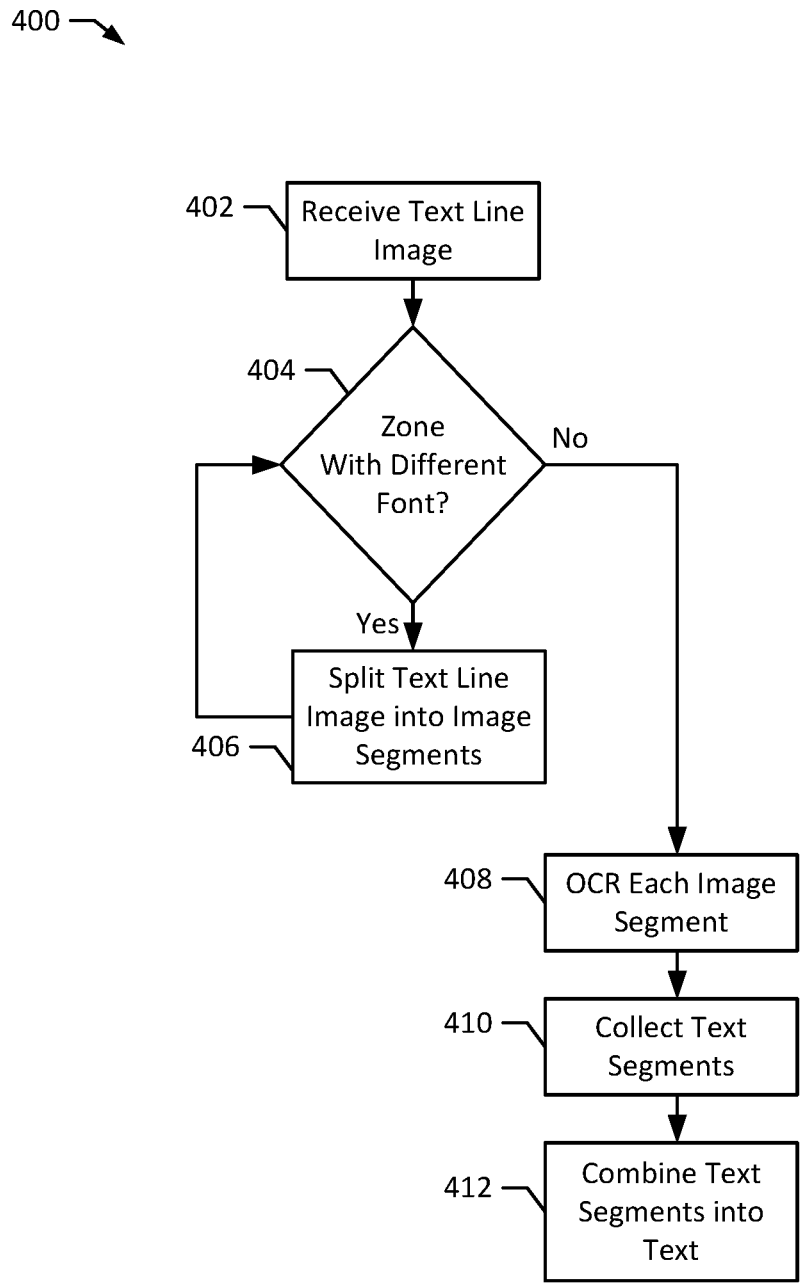
FIG. 4 illustrates a line splitting method according to an example embodiment of the present disclosure.

FIG. 4 depicts a line splitting method 400 according to an example embodiment of the present disclosure. The method 400, when executed, may be used to recognize multiple zones in a text line image 204, 206, 208, 302 and separate the zones in order to properly process the text line image 204, 206, 208, 302. For example, the method 400 may be used to perform the operations discussed above in connection with the line splitting operation 300. The method 400 may be implemented on a computer system, such as the system 200. For example, one or more steps of the method 400 may be implemented by the text line normalizer 254, the optical character recognizer 220, the font correction system 258, the text line image splitter 212, and/or the text assembler 256. The method 400 may also be implemented by a set of instructions stored on a computer readable medium that, when executed by a processor, cause the computer system to perform the method. For example, all or part of the method 400 may be implemented by the CPU 230, the GPU 260, and the memory 232. Although the examples below are described with reference to the flowchart illustrated in FIG. 4, many other methods of performing the acts associated with FIG. 4 may be used. For example, the order of some of the blocks may be changed, certain blocks may be combined with other blocks, one or more of the blocks may be repeated, and some of the blocks described may be optional.

The method 400 may begin with a document processing system 210 receiving a text line image 204, 206, 208, 302 (block 402). The text line image 204, 206, 208, 302 may be associated with a document 202 that is being analyzed by the document processing system 210. Properly analyzing the document 202 may require performing OCR with an optical character recognizer 220 in order to recognize a text in the document 202. To accurately perform OCR, the optical character recognizer 220 may require that the text line image 204, 206, 208, 302 be normalized with a text line normalizer 254, as discussed above.

However, in certain instances, the text line image 204, 206, 208, 302 may have one or more zones 240, 242, 244, 246, 248, 250, 252, wherein each zone 240, 242, 244, 246, 248, 250, 252 contains text whose font differs from the text of the adjacent zones 240, 242, 244, 246, 248, 250, 252. In such cases, as discussed above, text line images 204, 206, 208, 302 with multiple zones 240, 242, 244, 246, 248, 250, 252 may prevent the text line normalizer 254 from properly normalizing the text line image 204, 206, 208, 302. Accordingly, one or both of the document processing system 210 may then determine whether the text line image 204, 206, 208, 302 contains any such zones 240, 242, 244, 246, 248, 250, 252, for example using a text line image splitter 212 of a font correction system 258 (block 404). As discussed in further detail below, this determination may be made by analyzing one or more confidence measurements 224, 228, including one or both of an OCR confidence measurement 224 and a text height confidence measurement 228.

If zones 240, 242, 244, 246, 248, 250, 252 with different fonts are identified, the document processing system 210 may also select one or more splitting positions 214, 310, 312 between the zones 240, 242, 244, 246, 248, 250, 252 of the text line image 204, 206, 208, 302 and split the text line image 204, 206, 208, 302 at the splitting positions 214, 310, 312 into image segments 216, 218, 304, 306, 308, wherein each image segment 216, 218, 304, 306, 308 includes only one zone 240, 242, 244, 246, 248, 250, 252 (block 406). After splitting the image into image segments 216, 218, 304, 306, 308, the document processing system 210 may then analyze the image segments 216, 218, 304, 306, 308 to determine whether there are any additional zones 240, 242, 244, 246, 248, 250, 252 containing text whose font differs from the text of adjacent zones 240, 242, 244, 246, 248, 250, 252 (block 404) and if so, may again select one or more splitting positions 214, 310, 312 between the zones 240, 242, 244, 246, 248, 250, 252 and split the text line image 204, 206, 208, 302 into image segments 216, 218, 304, 306, 308 (block 406). In this way, the document processing system 210 may repeat blocks 404 and 406 until all zones 240, 242, 244, 246, 248, 250, 252 are identified and until the text line image 204, 206, 208, 302 is split into image segments 234, 236, 304, 306, 308 that each contain an individual zone 240, 242, 244, 246, 248, 250, 252. For example, the text line image 302 contained three zones, but during the first determination the font correction system 258 may only identify the first and second zones and splitting position 310. In this example, at block 406 the text line image splitter 212 may have split the text line image 302 into the image segment 304 and an image segment containing both the second and third zones. Thus, at the second occurrence of block 404, the font correction system may identify the third zone and at block 406 may select the second splitting position 312 with the text line image splitter 212 and may then split the image segment containing both the second and third zones into the image segment 306 containing the second zone and the image segment 308 containing the third zone. In certain embodiments, the text line image splitter 212 may include a threshold for the maximum number of times a text line image 204, 206, 208, 302 may be split (e.g., each text line image may only be split a maximum of 2 times, or 3 times). Such a threshold may prevent minor differences in the text line image 204, 206, 208, 302 from splitting the text line image 204, 206, 208, 302 an excessive number of times and delaying processing. In other embodiments, the text line image splitter 212 may implement a minimum horizontal size for each image segment 216, 218, 304, 306, 308, and may not split the text line image 204, 206, 208, 302 at the splitting position 214, 310, 312 if one or both of the resulting image segments 216, 218, 304, 306, 308 would be smaller than the minimum horizontal size. This may help prevent similar errors.

After all zones 240, 242, 244, 246, 248, 250, 252 are identified and the text line image 204, 206, 208, 302 is split into image segments 234, 236, 304, 306, 308, the font correction system 258 may determine that there are no further zones 240, 242, 244, 246, 248, 250, 252 and may proceed to perform OCR each image segment 234, 236, 304, 306, 308 with the optical character recognizer 220 (block 408). Prior to performing OCR on each image segment 234, 236, 304, 306, 308, the text line normalizer 254 may find a text height 226 of the text contained in each image segment 234, 236, 304, 306, 308 and may normalize the text contained within each image segment 234, 236, 304, 306, 308 so that it meets the requirements (e.g., size requirements, position requirements) of the optical character recognizer 220. For example, the optical character recognizer 220 may recognize the text segments 234, 236 of the image segments 234, 236, 304, 306, 308 using a machine learning model that has been trained on text line images 204, 206, 208, 302 or image segments 234, 236, 304, 306, 308 whose text meets certain size and positioning requirements. Therefore, to accurately recognize the text segments 234, 236 of the image segments 234, 236, 304, 306, 308, the image segments 234, 236, 304, 306, 308 may need to be normalized to meet the same or similar requirements. After the text line normalizer 254 normalizes the image segments 234, 236, 304, 306, 308, the optical character recognizer 220 may then recognize the text segments 234, 236 of the image segments 234, 236, 304, 306, 308 using the same machine learning model.

In certain implementations, and as will be described in greater detail below, the operations discussed in connection with block 404 may involve performing OCR on the image segments 234, 236, 304, 306, 308 in order to confirm that there are no further zones 240, 242, 244, 246, 248, 250, 252. Accordingly, in these implementations, block 408 may not be necessary and may thus be omitted. In such implementations, when there are no further zones 240, 242, 244, 246, 248, 250, 252 to identify, processing may proceed from block 404 to block 410.

After the optical character recognizer 220 recognizes the text segments 234, 236 contained within each image segment 234, 236, 304, 306, 308, the text assembler 256 may collect the text segments 234, 236 as they are recognized by the optical character recognizer 220 (block 410). For example, the optical character recognizer 220 may be configured to process text line images 204, 206, 208, 302 and image segments 234, 236, 304, 306, 308 similarly (e.g., using the same machine learning model or OCR techniques), and may generate a similar OCR output 222 including the text 238 (in the case of a text line image) or the text segment 234, 236 (in the case of an image segment 234, 236, 304, 306, 308), regardless of whether the optical character recognizer 220 analyzed a text line image 204, 206, 208, 302 or an image segment 234, 236, 304, 306, 308. Therefore, to properly track and recombine the recognized text segments 234, 236 of the image segments 234, 236, 304, 306, 308, the text assembler 256 may collect the text segments 234, 236 by, e.g., storing a copy of each text segment 234, 236 along with an indication of the image segment 234, 236, 304, 306, 308 from which it was recognized. In this way, the text assembler 256 may help ensure proper ordering and positioning of the recombined text 238 later on.

Although discussed as occurring in series, blocks 408 and 410 may be performed in parallel in some implementations. For example, the text assembler 256 may collect the text segments 234, 236 as they are recognized by the optical character recognizer 220. Further, blocks 408 and 410 may be performed such that, for example, OCR is performed on each image segment 234, 236, 304, 306, 308 to recognize the text segments 234, 236 prior to the text segments 234, 236 being collected by the text assembler 256. In other implementations, each image segment 234, 236, 304, 306, 308 may be processed at both of blocks 408 and 410 prior to the next image segment 234, 236, 304, 306, 308 being processed. For example, OCR may be performed on the image segments 234, 236, 304, 306, 308 one at a time, and the associated text segment 234, 236 recognized from each image segment 234, 236, 304, 306, 308 may be collected before OCR is performed on the next image segment 234, 236, 304, 306, 308.

Relatedly, the text assembler 256 may then combine the collected text segments 234, 236 of the image segments into a text 238 of the text line image 204, 206, 208, 302 overall (block 412). For example, using the stored indication of the image segment 234, 236, 304, 306, 308 associated with each text segment 234, 236, the text assembler 256 may arrange the text segments 234, 236 into the same order that the associated image segments appear in the text line image 204, 206, 208, 302. Additionally, the text line assembler 256 may arrange the text segments 234, 236 on the text line image 204, 206, 208, 302 so that the text segments 234, 236 overlay the text line image 204, 206, 208, 302 in the same location as the corresponding text 238 of the text line image 204, 206, 208, 302. In other embodiments, the OCR output 222 after recognizing each text segment 234, 236 in block 408 may include a copy of each corresponding image segment 234, 236, 304, 306, 308 with its associated text segment 234, 236 overlaid onto the image segment 234, 236, 304, 306, 308 such that the text segment 234, 236 overlaps the same portions of the image segment 234, 236, 304, 306, 308 that contain text. In such implementations, the text assembler 256 may combine the text segments 234, 236 into a text 238 of the text line image 204, 206, 208, 302 by appending the overlaid image segments 234, 236, 304, 306, 308 in the same order that the image segments 234, 236, 304, 306, 308 appear in the initial text line image 204, 206, 208, 302. After combining the text segments 234, 236 into a text 238 of the text line image 204, 206, 208, 302, processing may continue, e.g., by continuing to recognize the text 238 of other text line images 204, 206, 208, 302 from the document 202, or by continuing to process the document 202 and/or other documents 202 after the text of the document is recognized.

Although the method 400 is discussed in the context of a single text line image 204, 206, 208, 302, the method 400 may be performed on multiple text line images 204, 206, 208, 302. For example, the document 202 may contain multiple text line images 204, 206, 208, 302 that each contain multiple zones, containing text whose font differs from the text of adjacent zones, and the method 400 may be performed on each of the text line images 204, 206, 208, 302 to accurately recognize the text of the document 202. The text line images 204, 206, 208, 302 may be analyzed using the method 400 individually or in parallel depending on the implementation.

Figure 5:
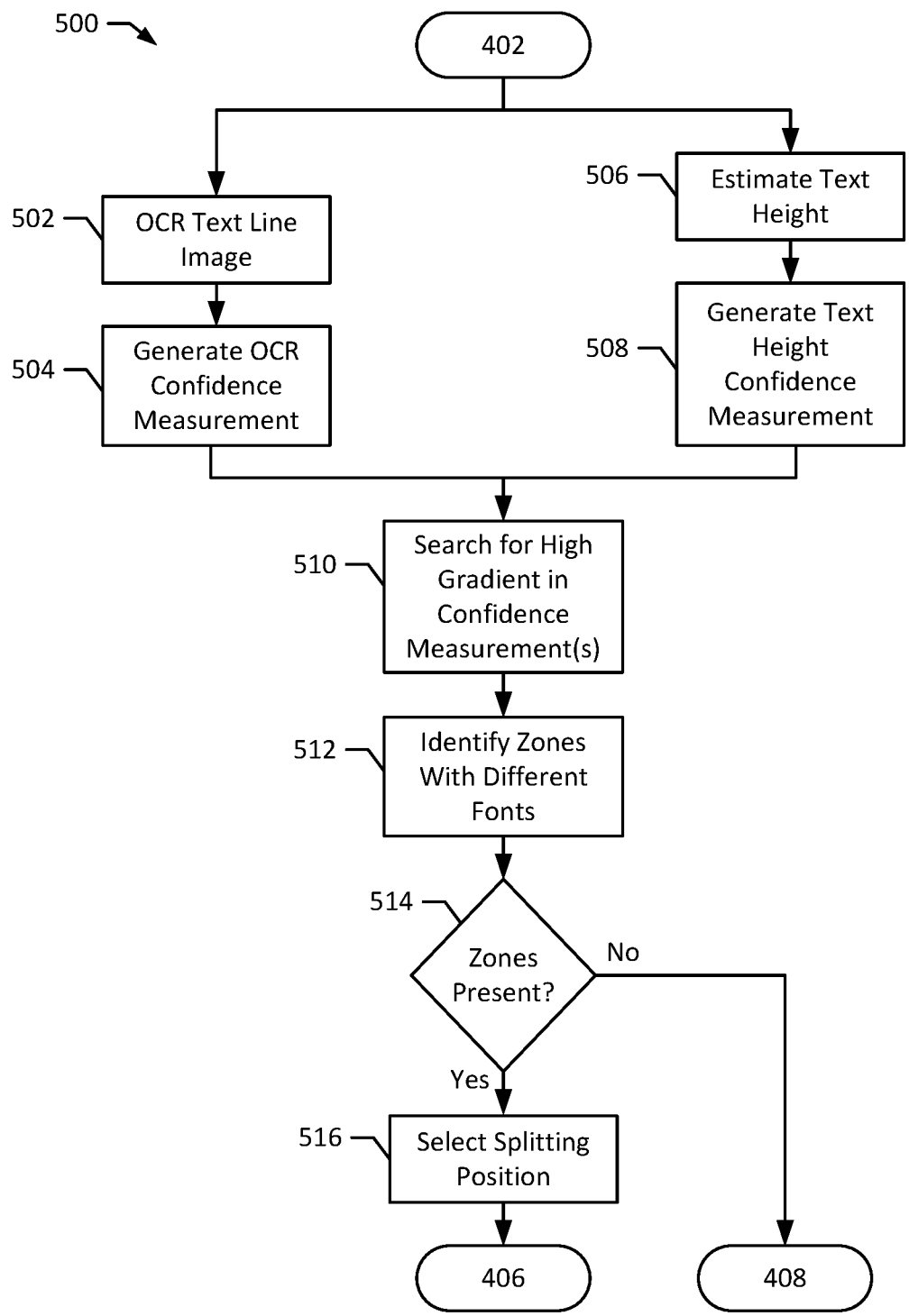
FIG. 5 illustrates a font correction method according to an example embodiment of the present disclosure.

FIG. 5 depicts a font correction method 500 according to an example embodiment of the present disclosure. The method 500, when executed, may be used to correct and prepare text line images 204, 206, 208, 302 containing multiple zones 240, 242, 244, 246, 248, 250, 252 of text whose font differs from the text of adjacent zones 240, 242, 244, 246, 248, 250, 252 for accurate optical character recognition. For example, when executed, the method 500 may identify one or more zones 240, 242, 244, 246, 248, 250, 252 within a text line image 204, 206, 208, 302 and may select one or more splitting positions 214, 310, 312 between the zones 240, 242, 244, 246, 248, 250, 252 identified. The method 500 may be implemented on a computer system, such as the system 200. For example, one or more steps of the method 500 may be implemented by the text line normalizer 254, the optical character recognizer 220, the font correction system, the text line image splitter 212, and/or the text assembler 256. The method 500 may also be implemented by a set of instructions stored on a computer readable medium that, when executed by a processor, cause the computer system to perform the method. For example, all or part of the method 500 may be implemented by the CPU 230, the GPU 260, and the memory 232. Although the examples below are described with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks described may be optional.

In certain implementations, the method 500 may implement one or more blocks of the line splitting method 400. For example, the method 500, when executed, may determine whether there are multiple zones 240, 242, 244, 246, 248, 250, 252 within a text line image 204, 206, 208, 302, as discussed above regarding block 404, and may select one or more splitting positions 214, 310, 312, as discussed above regarding block 406. Thus, as depicted in FIG. 5, the method 500 may be preceded by the document processing system 210 receiving a text line image 204, 206, 208, 302 (i.e., block 402).

The method 500 may begin with the optical character recognizer 220 performing OCR on the text line image 204, 206, 208, 302 to recognize a text of the text line image 204, 206, 208, 302 (block 502). While performing OCR on the text line image 204, 206, 208, 302, the optical character recognizer 220 may also generate an OCR confidence measurement 224 (block 504). For example, in performing OCR on a text line image, a machine learning model of the optical character recognizer 220 may provide a probability distribution of candidate recognized characters for each letter of the text line image 204, 206, 208, 302. For accurately-recognized text, the probability may be comparatively high for the most likely candidate recognized character, with the remaining probability distribution distributed among a plurality of other candidate recognized characters in comparatively small amounts. For example, if the letter being recognized is 'a', the probability distribution may be 95% for the candidate recognized character 'a', and the remaining 5% may be distributed among the other candidate recognized characters (e.g., 'e', 'o', 'c', 'u'). The optical character recognizer 220 may then be configured to select the candidate recognized character with the highest probability as the recognized letter (e.g., 'a' in the preceding example). Then, to generate an OCR confidence measurement 224, the optical character recognizer 220 may allocate the probability percentage of the selected candidate recognized character as the OCR confidence measurement 224 value for the corresponding letter in the text line image 204, 206, 208, 302. In other embodiments, the OCR confidence measurement 224 may be provided on a per-word basis, which may be calculated by taking the average OCR confidence measurement 224 value for the letters of each word, as determined in the preceding method. In another embodiment, the OCR confidence measurement 224 may be calculated on the basis of horizontal position by taking the average OCR confidence measurement 224 value of each letter in a sliding window around multiple horizontal positions (e.g., a certain number of letters or pixels before a horizontal position, after a horizontal position, or both). Additional OCR confidence measurements 224 may include: (1) a confidence measurement output from a machine learning model of the optical character recognizer 220 based on the strength of the machine learning model's prediction (e.g., how well it matched to the machine learning model), (2) a confidence measurement based on whether a recognized word of the text line image 204, 206, 208, 302 is located in a dictionary, and (3) analysis by a language model that predicts a likelihood that a recognized word or phrase of the text line image 204, 206, 208, 302 belongs to a particular language. The OCR confidence measurement 224 may reflect the confidence (e.g., predicted accuracy) of the OCR performed on the text line image 204, 206, 208, 302 at a plurality of horizontal positions within the text line image 204, 206, 208, 302. For example, the OCR confidence measurement 224 may indicate the confidence or predicted accuracy of the text recognized by the optical character recognizer 220 for each letter of the recognized text, or for each word of the recognized text, or for one or more horizontal pixel positions of the text line image 204, 206, 208, 302. In text line images 204, 206, 208, 302 whose text is all the same size, the OCR confidence measurement 224 may generally be high (e.g., above 80%) for most horizontal positions, meaning the optical character recognizer 220 was accurately able to recognize many or most of the text contained within the text line image 204, 206, 208, 302. However, for text line images 204, 206, 208, 302 containing zones 240, 242, 244, 246, 248, 250, 252 with text whose font differs from the text of adjacent zones 240, 242, 244, 246, 248, 250, 252, the OCR confidence measurement 224 may be lower for certain portions of the text line image 204, 206, 208, 302. For example, as discussed above in connection with FIG. 3, in certain implementations, the text line image 302 may be normalized according to the larger text height of the text in the second zone. Therefore, the optical character recognizer 220 may accurately recognize the text in the second zone (i.e., "This is larger text."), but inaccurately recognize the text in the first and third zones (i.e., "This is normal text." and "This is smaller text."). Therefore, the OCR confidence measurement 224 in the second zone may be high (e.g., above 80%) and may be low (e.g., below 50%) in the first and third zones.

In addition or alternatively to performing OCR on the text line image and generating the OCR confidence measurement (blocks 502, 504), the text line normalizer 254 may estimate a text height 226 of the text line image 204, 206, 208, 302 (block 506) and may generate a text height confidence measurement 228 (block 508). For example, in estimating a text height of a text line image 204, 206, 208, 302, the text line normalizer 254 may estimate a height for a plurality of horizontal positions within the text line image 204, 206, 208, 302 and then estimate the text height 226 of the text line image 204, 206, 208, 302 overall by identifying a majority of the height estimations for the plurality of horizontal positions. In estimating the height at the plurality of horizontal positions, the text line normalizer 254 may predict a percentage probability that the height at a given horizontal positions is one of a plurality of candidate heights, similar to how the optical character recognizer 220 may predict a percentage probability for a plurality of candidate recognized letters. In estimating the height at a given horizontal position, the text line normalizer 254 may select the candidate height with the highest percentage probability, and this percentage probability may be selected as the text height confidence measurement 228 for that horizontal position. In another implementation, the text line normalizer 254 may estimate the text height 226 of the text line image 204, 206, 208, 302 by analyzing one or more horizontal projections of the text line image 204, 206, 208, 302. In such implementations, the text height confidence measurement 228 may be estimated by analyzing a horizontal projection of each word in the text line image 204, 206, 208, 302 and determining whether each word differs from the estimated text height 226 of the text line image 204, 206, 208, 302 overall. For smaller differences, the text line normalizer 254 may estimate a higher text height confidence measurement 228 value and for larger differences, the text line normalizer 254 may estimate a lower value. Similar to the OCR confidence measurement 224, the text height confidence measurement 228 may indicate a predicted accuracy of the text height 226 estimation at a plurality of horizontal positions within the text line image 204, 206, 208, 302. For example, the text height confidence measurement 228 may indicate the confidence or predicted accuracy of the text height estimated by the text line normalizer 254 for each letter of the recognized text, or for each word of the recognized text, or for one or more horizontal pixel positions of the text line image 204, 206, 208, 302. In text line images whose text is all the same size, the text height confidence measurement 228 may generally be high (e.g., above 80%) for most horizontal positions, meaning the text line normalizer 254 was accurately able to recognize many or most of the words contained within the text line image 204, 206, 208, 302. However, for text line images 204, 206, 208, 302 containing zones 240, 242, 244, 246, 248, 250, 252 with text whose font differs from the text of adjacent zones 240, 242, 244, 246, 248, 250, 252, the text line normalizer 254 may be lower for certain portions of the text line image 204, 206, 208, 302. For example, as discussed above in connection with FIG. 3, in certain implementations, the text line normalizer 254 may estimate the text height 226 of the text line image 302 as the larger text height of the text in the second zone. Therefore, the text line normalizer 254 may accurately estimate the text height 226 in the second zone (i.e., the larger text height), but inaccurately estimate the text height 226 in the first and third zones (i.e., the normal and smaller text heights). Therefore, the text height confidence measurement 228 in the second zone may be high (e.g., above 80%) and may be low (e.g., below 50%) in the first and third zones.

Although depicted as happening in parallel, blocks 502, 504 and 506, 508 may instead happen in other orders. In certain embodiments, blocks 506 and 508 may happen before blocks 502 and 504. For example, the text line normalizer 254 may estimate a text height 226 of the text line image 204, 206, 208, 302 and generate the text height confidence measurement 228 before the optical character recognizer 220 performs OCR on the text line image 204, 206, 208, 302, e.g., in connection with normalizing the text line image 204, 206, 208, 302 prior to performing OCR. In other examples, one of the confidence measurements 224, 228 may not be generated. For example, certain implementations may generate an OCR confidence measurement 224 (block 504) and may not generate a text height confidence measurement 228 (block 508), or vice versa.

Next, the font correction system 258 may search for a large gradient in one or both of the confidence measurements 224, 228 (block 510). The font correction system 258 may identify a large gradient as a large increase or a large decrease in the OCR confidence measurement 224 or in the text height confidence measurement 228. For example, a gradient may be identified by taking the absolute value of the difference between confidence measurement 224, 228 values for two or more horizontal positions (e.g., adjacent horizontal positions, adjacent words) of the text line image 204, 206, 208, 302. In another example, the gradient may be calculated by taking a moving average or moving median of the confidence measurement 224, 228 before calculating the absolute value of the difference between two or more horizontal positions of the text line image 204, 206, 208, 302. A large gradient may be identified if a calculated gradient exceeds a particular threshold, e.g., an increase in the OCR confidence measurement 224 that exceeds a certain threshold or a decrease in the OCR confidence measurement 224 whose magnitude exceeds a certain threshold. For example, a gradient of 30%, indicating a change in the confidence measurement 224, 228 of 30 percentage points (i.e., from 80% to 50%), may be identified as a large gradient. The value of this threshold may depend on the values of the confidence measurements 224, 228. For example, a smaller threshold may be necessary to correctly identify a large gradient if the confidence measurement 224, 228 values are all close together.

In implementations with only a single confidence measurement 224, 228 (i.e., only the OCR confidence measurement 224 or only the text height confidence measurement 228), the font correction system 258 may search for a large gradient in the single confidence measurement 224, 228. In implementations with more than one confidence measurement 224, 228, the font correction system 258 may search for large gradients in each of the confidence measurements 224, 228. For example, the font correction system 258 may search for large gradients in both the text height confidence measurement 228 and the OCR confidence measurement 224. After finding one or more large gradients in the confidence measurements 224, 228, the font correction system 258 may take note of or store the location or area of each of the large gradients and an indication of the confidence measurement 224, 228 in which each large gradient was identified.

Next, the font correction system 258 may determine whether zones 240, 242, 244, 246, 248, 250, 252 with different fonts are present (block 512). In making the determination, the font correction system 258 may analyze the large gradients identified in the confidence measurements 224, 228. For example, the font correction system 258 may analyze both the OCR confidence measurement 224 and the text height confidence measurement 228 and determine that there are zones 240, 242, 244, 246, 248, 250, 252 with differing fonts in the text line image 204, 206, 208, 302 if the large gradients are in similar locations in both the OCR confidence measurement 224 and the text height confidence measurement 228. As a further example, if both the OCR confidence measurement 224 and the text height measurement 228 include large gradients identified as corresponding to a portion of the text line image 204, 206, 208, 302 that is between the same two words, or between similar letters (e.g., letters in close proximity to one another), the font correction system 258 may determine that there are multiple zones 240, 242, 244, 246, 248, 250, 252 in the text line image 204, 206, 208, 302. In a still further example, if the confidence measurements 224, 228 are provided by pixel positions within the text line image 204, 206, 208, 302, and the large gradients are within a certain threshold, the font correction system 258 may determine that zones 240, 242, 244, 246, 248, 250, 252 with differing fonts exist. In particular, the font correction system 258 may determine that one zone 240, 242, 244, 246, 248, 250, 252 exists to the left of each large gradient area (e.g., to the left of each area or approximate area where both confidence measurements have a large gradient) and another zone 240, 242, 244, 246, 248, 250, 252 exists to the right of each large gradient.

In other implementation, there may only be one confidence measurement 224, 228 generated (e.g., only an OCR confidence measurement 224 or only a text height confidence measurement 228). In such implementations, the font correction system 258 may identify multiple zones 240, 242, 244, 246, 248, 250, 252 if there is a large gradient in the only confidence measurement 224, 228. For example, if there is only an OCR confidence measurement 224 and the OCR confidence measurement 224 has a large gradient in a given location (e.g., between two words, between two letters, at a particular word or letter, or at a particular pixel position), the font correction system 258 may determine that multiple zones 240, 242, 244, 246, 248, 250, 252 exist, with one zone 240, 242, 244, 246, 248, 250, 252 to the left of the large gradient area and one zone 240, 242, 244, 246, 248, 250, 252 to the right of the large gradient area.

In certain implementations, there may be more than one large gradient in the confidence measurement (or confidence measurements). As such, the font correction system 258 may identify more than two zones 240, 242, 244, 246, 248, 250, 252, with a different zone 240, 242, 244, 246, 248, 250, 252 on either side of each area of a large gradient (or, in certain implementations where more than two confidence measurements 224, 228 are used, on either side of each area or approximate area where both confidence measurements 224, 228 have a large gradient). For example, if only the text height confidence measurement 228 is used and the text height confidence measurement 228 has two large gradients, the font correction system 258 may identify a first zone 240, 242, 244, 246, 248, 250, 252 to the left of the first large gradient, a second zone 240, 242, 244, 246, 248, 250, 252 to the right of the first large gradient and to the left of the second large gradient, and a third zone 240, 242, 244, 246, 248, 250, 252 to the right of the second large gradient. Similar analysis may be performed using more than one confidence measurement 224, 228, using areas of common large gradients in both confidence measurements 224, 228, as identified above.

If there are zones 240, 242, 244, 246, 248, 250, 252 with different fonts present (block 514), the font correction system 258 may then proceed to select a splitting position 214, 310, 312 (block 516). Once the zones 240, 242, 244, 246, 248, 250, 252 are identified at block 512, the splitting position 214, 310, 312 may be selected as a horizontal position within the text line image 204, 206, 208, 302 between the two zones 240, 242, 244, 246, 248, 250, 252. For example, if the zones 240, 242, 244, 246, 248, 250, 252 are identified as containing certain words or letters of the text, the splitting position 214, 310, 312 may be selected as a horizontal position between the two words (e.g., a space character or punctuation separating the words or letters that define the zone, or a geometric middle between the two words as recognized by the optical character recognizer 220). In another example, if the zones 240, 242, 244, 246, 248, 250, 252 are identified as a certain range of horizontal positions (e.g., a range of horizontal pixel positions), the splitting position 214, 310, 312 may be selected as one of the horizontal positions between or on the border of the ranges of horizontal positions defining the zones 240, 242, 244, 246, 248, 250, 252. In certain implementations, the splitting position 214, 310, 312 may be selected as the location of the large gradient in the confidence measurements 224, 228. For example, as described above, the zones 240, 242, 244, 246, 248, 250, 252 may be defined as a first zone 240, 242, 244, 246, 248, 250, 252 to the left of a large gradient and a second zone 240, 242, 244, 246, 248, 250, 252 to the right of the large gradient. Therefore, the splitting position 214, 310, 312 may be selected as a location within the large gradient, which is between the two zones 240, 242, 244, 246, 248, 250, 252 (e.g., the middle of the large gradient positions).

Similar to block 512, the font correction system 258 may select more than one splitting position 214, 310, 312 if more than two zones 240, 242, 244, 246, 248, 250, 252 were identified. For example, if three zones 240, 242, 244, 246, 248, 250, 252 are identified as discussed above, the font correction system 258 may select two splitting positons 214, 310, 312, one within each of the large gradients in the confidence measurement or measurements 224, 228.

After selecting the splitting positions 214, 310, 312, processing may continue, for example by proceeding to block 406 of the method 400 discussed above, with the text line image splitter 212 splitting the text line image at each of the one or more splitting position 214, 310, 312 selected to create image segments 234, 236, 304, 306, 308.

If there are no zones 240, 242, 244, 246, 248, 250, 252 with different fonts present (block 514), the font correction system 258 may complete its processing of the text line image 204, 206, 208, 302, and the document processing system 210 may instead resume processing the text line image 204, 206, 208, 302 normally, e.g., by normalizing and performing OCR on the text line image 204, 206, 208, 302 (block 506).

Although discussed solely in the context of the font correction system 258 performing the above operations in connection with blocks 510, 512, 514, 516, in certain implementations, these operations may also be performed by the text line image splitter 212, or by a combination of both the text line image splitter 212 and the font correction system 258. Additionally, although the method 500 is discussed in the context of a single text line image 204, 206, 208, 302, the method 500 may be performed on multiple text line images 204, 206, 208, 302. For example, the document 202 may contain multiple text line images 204, 206, 208, 302 and the method 500 may be performed on each of the text line images 204, 206, 208, 302 in order to prepare the document 202 for optical character recognition. The text line images 204, 206, 208, 302 may be analyzed using the method 500 individually or in parallel depending on the implementation.

Figure 6A:
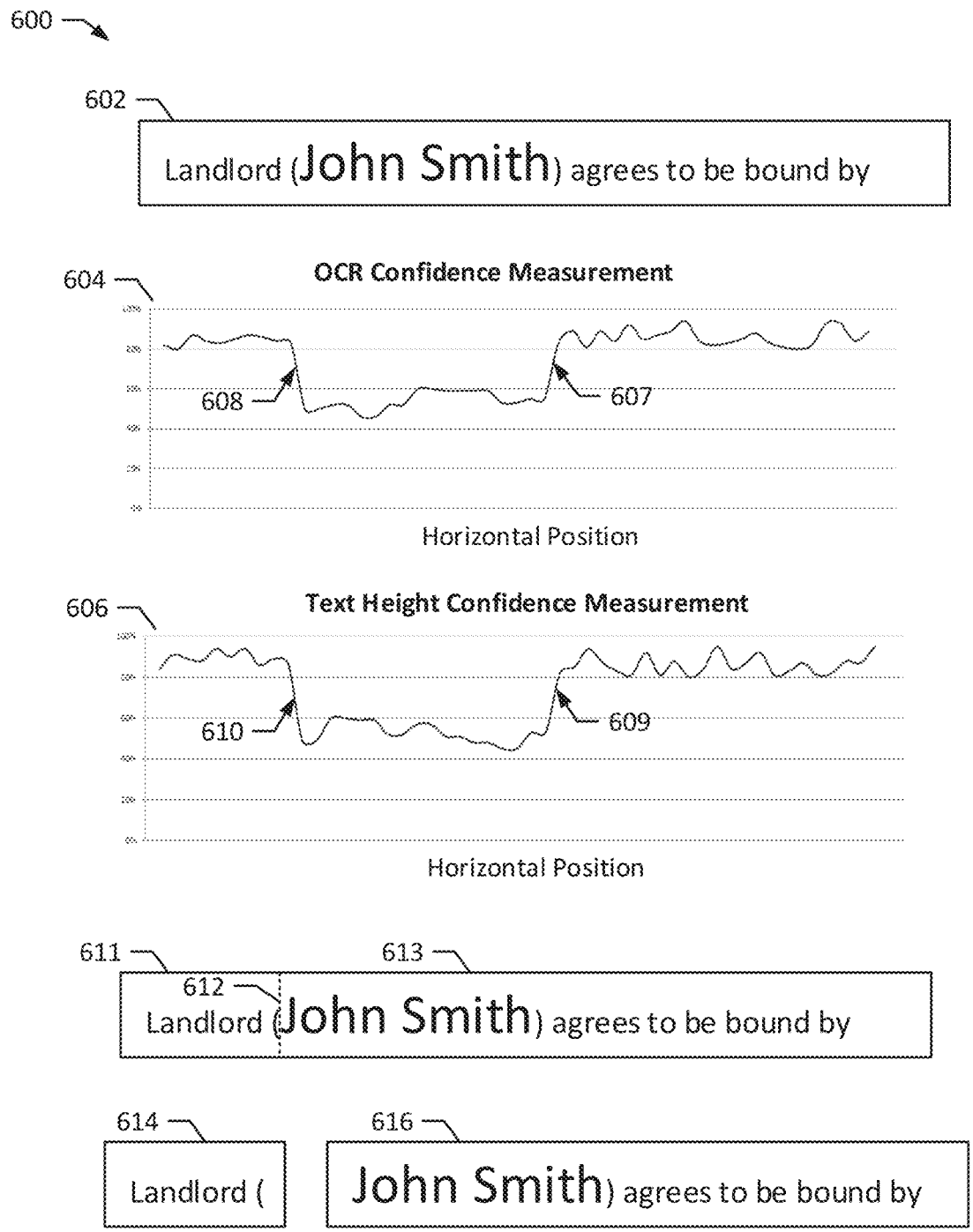

FIGS. 6A-6C depict an example line splitting operation 600 according to an example embodiment of the present disclosure. The line splitting operation 600 includes a text line image 602 containing the text "Landlord (John Smith) agrees to be bound by." However, the text "John Smith" is larger in size than the text "Landlord (" and the text ") agrees to be bound by." The difference in the size of the text contained within the text line image may negatively affect the accuracy of a text recognized by OCR, as discussed above. The text size difference may be the result of using a machine or computer to prepare the document 202 containing the text. For example, the text line image 602 may have come from a document 202 that is a lease (e.g., a residential lease). The lease may have been prepared by a computer system using a template, either automatically or by an individual preparing the lease electronically (e.g., by entering the party names). In certain instances, (e.g., if the lease template is stored as a PDF), certain computer programs (e.g., PDF editors) may enter text into form fields of the template with text larger than the size of the text in the rest of the template. Accordingly, when the name John Smith was entered electronically as the name of the Landlord in the agreement, it my have been entered in text larger than the rest of the template and thus the rest of the text line image 602. After the lease was prepared, it may have been printed, signed by the parties, and scanned as a document image 202 for processing by the document processing system 210. Subsequent processing of the document 202 may rely on accurate recognition of the names of the parties to the lease, and so it may be essential that the landlord's name (John Smith) is accurately recognized.

Therefore, to ensure such names are accurately recognized, it may be necessary to perform the line splitting operation 600 to prepare the text line image 602 for processing by a text line normalizer 254 and an optical character recognizer 220. As depicted, the text line image 602 has three zones with differing fonts (e.g., different font sizes): a first zone containing "Landlord (", a second zone containing "John Smith" and a third zone containing ") agrees to be bound by". To properly process and recognize the text in the text line image 602, it may be necessary to split the text line image 602 into a plurality of image segments 614 (depicted in FIG. 6A), 628, 630 (depicted in FIG. 6B), each containing a single zone of the text line image 602.

To begin the line splitting operation 600, one or more confidence measurements 604, 606 may be generated. For example, a text line normalizer 254 may estimate a text height 226 of the text line image 602 and may generate a text height confidence measurement 606 indicating a predicted accuracy of the text height 226 estimate for one or more horizontal positions within the text line image 602. As depicted, the text height confidence measurement 606 indicates the predicted accuracy of the text height measurement for each letter of the text line image 602, and is depicted to align with the text line image 602 such that the text height confidence measurement 606 for each letter is approximately below the corresponding letter as depicted in the text line image 602. The same alignment is depicted for the other confidence measurements 604, 618, 620, 632, 634 throughout the line splitting operation 600. As can be seen, the text height confidence measurement 606 is generally high (e.g., between 80-100%) for the first and third zones and is generally low (e.g., less than 50%) for the second zone. This may suggest that the text line normalizer 254 estimated the text height 226 of the text line image 602 as the height of the smaller text, as the smaller text is used in most of the text line image 602. Alternatively, the text line normalizer 254 may have estimated the text height as the height of the smaller text because the smaller text was used at the beginning of the text line image 602. In either case, the relatively higher predicted accuracy for the first and third zones 611, 627 and the relatively lower accuracy of the second zone 625 create two large gradients 610, 609 in the text height confidence measurement 606.

In addition or alternative to the text height confidence measurement 606, an optical character recognizer 220 may perform OCR on the text line image 602 and may generate an OCR confidence measurement 604 indicating a predicted accuracy of the text recognized at a plurality of horizontal positions within the text line image. As depicted, the OCR confidence measurement 604 is generally high (e.g., between 80-100%) for the first and third zones and generally low (e.g., less than 50%) for the second zone. This may have resulted from the text line normalizer estimating the text height 226 of the text line image 602 as the text height 226 of the smaller text of the first and third zones 611, 627 and therefore normalizing the text line image 602 according to the smaller text height, resulting in the text line image 602 being properly normalized for OCR processing in the first and third zones, but improperly normalized for the larger text of the second zone. As shown, the relatively higher predicted accuracy for the first and third zones 611, 627 and the relatively lower accuracy of the second zone 625 create two large gradients 608, 607 in the OCR confidence measurement 604.

Also, although two confidence measurements 604, 606 are shown, in certain embodiments only a single confidence measurement 604, 606 may be used (e.g., only the OCR confidence measurement 604 or only the text height confidence measurement 606).

The font correction system 258 may then analyze the confidence measurements 604, 606 to identify the zones 611, 625, 627 within the text line image 602. In implementations with a single confidence measurement 604, 606, the font correction system 258 may determine that zones 611, 613 are present in the text line image 602 if there is at least one large gradient 608, 610 in the confidence measurement 604, 606. In implementations with more than one confidence measurement 604, 606, the font correction system 258 may determine that zones 611, 625, 627 are present in the text line image 602 if there are large gradients 608, 610, 607, 609 in similar areas for both confidence measurements 604, 606. In this example, as there are two confidence measurements 604, 606, the font correction system 258 may determine that zones exist because the large gradients 608, 610 are in similar locations (e.g., between the "(" and "J" characters of the text line image 602) and because the large gradients 607, 609 are in similar areas (e.g., between the "h" and ")" character of the text line image 602).

Although there are two areas with large gradients 608, 610, 607, 609, for the purposes of this example it is assumed that the font correction system 258 is only configured to process a single large gradient 608, 610, 607, 609 at a time, and may therefore only identify two zones 608, 610, 607, 609 at a time. Therefore, the font correction system 258 may identify a first zone 611 as the portion of the text line image 602 to the left of the large gradients 608, 610 and a second zone 613 as the portion of the text line image 602 to the right of the large gradients 608, 610. Of course, other implementations are possible, as discussed above, and in certain implementations the font correction system 258 may be configured to process two or more large gradient areas in the same operation and may therefore identify three or more zones 611, 625, 627, as discussed in greater detail above.

After determining that zones 611, 613 are present in the text line image 602, the text line image splitter 212 may then select a splitting position 612. Because the different text sizes in each zone 611, 613 negatively impact the accuracy of either or both the text height 226 estimation or the OCR procedure, a large gradient 608, 610 from high to low accuracy is likely to occur between the zones 611, 613. Therefore, in certain implementations, the font correction system 258 may select the splitting position 612 as a location common to the large gradients 608, 610 in both confidence measurements 604, 606. For example, the splitting position 612 may be selected because it is common to both large gradients 608, 610.

After selecting the splitting position 612 the text line image splitter 212 may then split the text line image 602 at the splitting position 612 into the image segment 614 containing the zone 611 to the left of the splitting position 612 and the image segment 616 containing the zone 613 to the right of the splitting position 612. After this operation, the image segment 614 now contains a single zone 611 and may be ready for processing by the text line normalizer 254 and the optical character recognizer 220. However, the image segment 616 still contains both the second and third zones 625, 627 and is therefore not ready for such processing.

Accordingly, the above steps may be repeated on the image segment 616. For example, as shown in FIG. 6B, the text line normalizer 254 may estimate a text height 226 for the image segment 616 and may generate a text height confidence measurement 620. Because the second zone 625 and the third zone 627 occupy roughly the same area within the image segment 616, the text line normalizer 254 may estimate the text height 226 of the image segment 616 to be the larger height of the text in the second zone 625 because that is the text that comes first in the image segment 616. Accordingly, the text height confidence measure 620 is generally high for the second zone 625 and generally low for the third zone 627, creating a large gradient 624.

Also, the optical character recognizer 220 may perform OCR on the image segment 616 after the text line image normalizer 254 normalizes the image segment 616 according to the estimated text height 226 and may generate an OCR confidence measurement 618 that predicts the accuracy of the text recognition at a plurality of horizontal positions within the image segment 616. Given that, in this example, the image segment 616 is normalized according to the larger height of the text in the second zone 625, the OCR confidence measurement 618 is generally high in the second zone and generally low in the third zone, creating a large gradient 622.

Given that the large gradients 622, 624 are in similar horizontal locations in both confidence measurements 618, 620, the text line image splitter 212 may identify two zones 625, 627, to the left and right of the large gradients 622, 624, respectively. Next, the text line image splitter 212 may select a splitting position 626 that aligns with the large gradients 618, 622 and may split the image segment 616 into the image segment 628 containing the second zone 625 and the image segment 630 containing the third zone 627.

Now that there are three image segments 615, 628, 630, each containing one of the three zones 611, 625, 627 of the original text line image 602, the image segments may be ready for processing by the text line normalizer 254 and the optical character recognizer 220. However, in practice, the document processing system 210 may not yet be able to determine whether all of the zones 611, 625, 627 have been identified (e.g., because the document processing system 210 only processes a single large gradient 622, 624 at a time, or because it may not be possible to identify additional zones 611, 625, 627 using large gradients 622, 625 until the text line image 602 has been split enough times by the text line image splitter 212.

Accordingly, as shown in FIG. 6C, the line splitting steps may again be applied to the image segment 630 to ensure that all zones are properly identified and split into image segments. Similar to before, the text line normalizer 254 may estimate a text height 226 of the image segment 630 and may generate a text height confidence measurement 634 indicating the predicted accuracy of the text height estimation at a plurality of horizontal positions within the image segment 630. However, unlike before, the text height confidence measurement 634 is generally high across the entire image segment 630, because the text is all of the same font and font size, and thus generally has the same text height. Similarly, the optical character recognizer 220 may perform OCR on the image segment 630 after it has been normalized according to the estimated text height and may generate an OCR confidence measurement 632 indicating the predicted accuracy of the recognized text of the image segment 630. As can be seen, the OCR confidence measurement 632 is generally high across the horizontal positions of the image segment 630.

Because both confidence measurements 632, 634 are generally high across the image segment 630, there are no large gradients, and the text line image splitter may therefore determine that there are no zones 611, 625, 627 within the image segment 630. Accordingly, as there are no more zones 611, 625, 627 contained within the image segment 630, the font correction system 258 may determine that the image segment 630 is ready for further processing by the document processing system, e.g., by the text line image normalizer and the optical character recognizer.

Although the steps of FIG. 6C are only shown for image segment 630, similar processing may be performed on the image segments 615, 628 to ensure these image segments 614, 628, 630 are ready for continued processing. After these steps are complete, the text line image 602 may be further analyzed as discussed above in connection with the method 400 to recognize the text segments 234, 236 of each image segment 614, 628, 630 and to combine the text segments 234, 236 into a text 238 of the text line image 602. Alternatively, in embodiments where an OCR confidence measurement 604, 618, 632 is used to identify zones 611, 625, 627, the text segments 234, 236 of the image segments 615, 628, 630 may already be recognized in creating the OCR confidence measurement 632 that confirms there are not further zones. Accordingly, further processing may not be necessary in such implementations to recognize the text segments, and the text assembler may instead directly proceed to combine the text segments 234, 236 into a text 238 of the text line image 602.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
   (a) receiving a text line image associated with a line of text contained within a document image;
   (b) selecting at least one splitting position between multiple zones of the text line image, wherein each zone contains text whose font differs from the text of each adjacent zone;
   (c) splitting the text line image at the splitting position into a plurality of image segments; and
   (d) recognizing, within each image segment, a corresponding text segment of each image segment.

2. The method of claim 1, further comprising:
   combining the text segments to create a text of the text line image.

3. The method of claim 1, wherein step (b) further comprises:
   selecting the splitting position within the text line image based on a predicted OCR accuracy of the text line image.

4. The method of claim 3, wherein the splitting position is selected based on a gradient of the predicted OCR accuracy.

5. The method of claim 3, wherein the OCR accuracy is predicted for one or more words contained in the text line image.

6. The method of claim 1, wherein s step (b) further comprises:
   selecting a splitting position within the text line image based on a predicted accuracy of an estimated text height for the text line image.

7. The method of claim 6, wherein the splitting position is selected based on a gradient of the predicted accuracy of the estimated text height.

8. The method of claim 6, wherein the predicted accuracy of the estimated text height is predicted for one or more words contained in the text line image.

9. The method of claim 1, wherein steps (b) and (c) are repeated on at least one of the image segments to select additional splitting positions of the text line image and to split the text line image into additional image segments.

10. The method of claim 1, wherein the text whose font differs from the text of each adjacent zone with a difference from the group consisting of: a different size, a different typeface, and/or a different vertical position within the text line image.

11. The method of claim 1, further comprising repeating steps (a) to (d) on a plurality of text line images associated with the document image.

12. A system comprising:
   a processor; and
   a memory storing instructions which, when executed by the processor, cause the processor to:
   (a) receive a text line image associated with a line of text contained within a document image;
   (b) select at least one splitting position between multiple zones of the text line image, wherein each zone contains text whose font differs from the text of each adjacent zone;
   (c) split the text line image at the splitting position into a plurality of image segments; and
   (d) recognize, within each image segment, a corresponding text segment of each image segment.

13. The system of claim 12, wherein the memory contains further instructions which, when executed by the processor, cause the processor to:
   combine the text segments to create a text of the text line image.

14. The system of claim 12, wherein the memory contains further instructions which, when executed by the processor at step (b), cause the processor to:
   select the splitting position within the text line image based on a predicted OCR accuracy of the text line image.

15. The system of claim 14, wherein the splitting position is selected based on a gradient of the predicted OCR accuracy.

16. The system of claim 12, wherein the memory contains further instructions which, when executed by the processor at step (b), cause the processor to:

select a splitting position within the text line image based on a predicted accuracy of an estimated text height for the text line image.

17. The system of claim 16, wherein splitting position is selected based on a large gradient of the predicted accuracy of the estimated text height.

18. The system of claim 12, wherein the memory contains further instructions which, when executed by the processor, cause the processor to repeat steps (b) (c) on at least one of the image segments to select additional splitting positions of the text line image and to split the text line image into additional image segments.

19. The system of claim 12, wherein the document processing system is further configured, when executed by the processor, to repeat steps (a) to (d) on a plurality of text line images associated with the document image.

20. A computer-readable medium containing instructions which, when executed by one or more processors, cause the one or more processors to:

(a) receive a text line image associated with a line of text contained within a document image, the text line image comprising a plurality of zones, wherein each zone contains text whose font differs from the text of each adjacent zone;

(b) select at least one splitting position between multiple zones of the text line image, wherein each zone contains text whose font differs from the text of each adjacent zone;

(c) split the text line image at the splitting position into a plurality of image segments; and (d) recognize, within each image segment, a corresponding text segment of each image segment.

* * * * *